United States Patent [19]

Kitamori et al.

[11] Patent Number: 4,774,026
[45] Date of Patent: Sep. 27, 1988

[54] PROCESS AND APPARATUS FOR OXIDIZING OR REDUCING DISSOLVED SUBSTANCE

[75] Inventors: Takehiko Kitamori; Takashi Nishi; Tetsuo Fukasawa; Haruo Fujimori; Akira Sasahira, all of Hitachi; Yoshihiro Ozawa; Kazumichi Suzuki, both of Mito; Hideo Yusa, Katsuta, all of Japan

[73] Assignee: Hitachi, Ltd., Tokyo, Japan

[21] Appl. No.: 5,961

[22] Filed: Jan. 22, 1987

[30] Foreign Application Priority Data

Jan. 22, 1986 [JP] Japan .................. 61-10156

[51] Int. Cl.$^4$ .................. B01J 19/12; G21F 9/16; G21E 19/42
[52] U.S. Cl. .................. 252/627; 204/157.15; 204/157.21; 204/157.22; 204/157.41; 204/157.44; 204/157.5; 204/157.51; 252/629
[58] Field of Search .......... 252/627; 204/1.5, 157.15, 204/157.4, 157.44, 157.41, 157.42, 157.43, 157.61, 157.62, 157.63, 903, 902, 904, 905, 909, 157.93, 157.2, 157.21, 157.22, 157.5, 157.51; 423/3, 251; 429/111

[56] References Cited

U.S. PATENT DOCUMENTS

| | | | |
|---|---|---|---|
| 3,085,952 | 4/1963 | Odioso et al. | 204/157.15 |
| 3,901,806 | 8/1975 | Murchison | 204/157.15 |
| 4,451,342 | 5/1984 | Lichtin et al. | 204/157.93 |
| 4,571,290 | 2/1986 | Ward et al. | 204/157.93 |
| 4,619,838 | 10/1986 | Meier et al. | 204/157.15 |
| 4,655,891 | 4/1987 | Ward et al. | 204/157.93 |

FOREIGN PATENT DOCUMENTS

| | | | |
|---|---|---|---|
| 2146262 | 3/1973 | Fed. Rep. of Germany | 204/1.5 |
| 2929122 | 2/1981 | Fed. Rep. of Germany | 204/1.5 |
| 48-23689 | 3/1973 | Japan . | |
| 57-67002 | 4/1982 | Japan . | |
| 59-203701 | 11/1984 | Japan . | |
| 60-50172 | 3/1985 | Japan . | |

OTHER PUBLICATIONS

Jensen et al., Recovery of Noble Metals from Fission Products, Nuclear Technology, vol. 65, May 1984, pp. 305–324.

Primary Examiner—Stephen J. Lechert, Jr.
Assistant Examiner—Howard J. Locker
Attorney, Agent, or Firm—Antonelli, Terry & Wands

[57] ABSTRACT

A dissolved substance contained in a solution is oxidized or reduced by adding a particulate semiconductor photocatalyst and a water-soluble electron acceptor or donor for the particulate semiconductor photocatalyst to a solution containing a dissolved substance, and irradiating the particulate semiconductor photocatalyst in the solution with an electromagnetic wave having an energy high enough to excite the particulate semiconductor photocatalyst, or by adding a particulate semiconductor photocatalyst and a water-soluble electron acceptor or donor for the particulate semiconductor photocatalyst to a solution containing a dissolved substance and irradiating the particulate semiconductor photocatalyst in the solution with an electromagnetic wave having an energy high enough to excite the particulate semiconductor photocatalyst and having a wavelength outside the absorption wavelength region of a precursor substance capable of producing an oxidation or reduction reaction-inhibiting substance, whereby (1) ions or complexes are converted to simple substances or to ions or compounds with different valencies, and (2) simple substances, ions, complexes or other compounds are separated and recovered or removed by utilizing its actions and effects.

31 Claims, 6 Drawing Sheets

PROCESS AND APPARATUS FOR OXIDIZING OR REDUCING DISSOLVED SUBSTANCE

BACKGROUND OF THE INVENTION

This invention relates to a process and an apparatus for oxidizing or reducing a dissolved substance with a semiconductor photocatalyst, and more particularly to a process and an apparatus for oxidizing or reducing a dissolved substance, suitable for separation and recovery of metal ions by oxidation or reduction, synthesis or decomposition of a polymeric substance, or production of hydrogen by decomposition of water.

A known process for reducing a dissolved substance, for example, metal ions, in a solution, by using an action of semiconductor photocatalyst is disclosed in Japanese Patent Application Kokai (Laid-open) No. 60-50172. The object of the process is to conduct metal plating on the surface of a catalyst substrate provided on a thin layer of semiconductor substance; and thus, the oxidation or reduction reaction is limited to the surface of the substrate even if the oxidation or reduction is directed to a dissolved substance in a solution. Therefore, the reaction efficiency seems to be rather low. In the case of oxidation or reduction of metal ions in a system containing many ion species, such as solution resulting from spent nuclear fuel reprocessing, there exists another problem, i.e., that the reduction efficiency is considerably lowered by formation of reaction-inhibiting substances by irradiation with an exciting beam, for example, by formation of nitrous acid through decomposition of nitric acid.

Heretofore known examples of using fine particles of semiconductor photocatalyst have been limited only to decomposition of water to produce hydrogen by using a solar beam energy, as given in Japanese Patent Applications Kokai (Laid-open) Nos. 57-67002 and 59-203701. Now, extensive studies have been made on the utilization of semiconductor photocatalysts in other fields. In heretofore known examples, the exciting beams for irradiation are selected on the basis of the band gap energy of a semiconductor substance to be used without taking peculiar light-absorbing characteristics of the fine particles into account. In other words, the heretofore proposed processes have a rather low photo energy utilization.

In reprocessing spent nuclear fuel discharged from atomic power plants, on the other hand, adjustment of the valency of metal ions is an important step for separating the nuclear fuel substances and various fission products dissolved in the nitric acid solution. For example, in separation of such nuclear fuel substances as U and Pu from each other, it is necessary to adjust the valency of Pu to a trivalent state in which Pu is never extracted into the organic solvent, and in this connection the tetravalent U is generally used as a reducing agent. However, more than the stoichiometrical amount of U is required. This leads to a new problem that the isotope composition of U product will be deteriorated. Particularly in case of the increased amount of Pu as contained in the spent nuclear fuel from a fast breader reactor, the problem is quite considerable.

A reduction process by electrolysis is disclosed in Japanese Patent Application Kokai (Laid-open) No. 48-23689, but the voltage loss through a solution is so large that an overvoltage is required, resulting in a poor energy efficiency. Also, an apparatus for the process will be complicated and will have a problem in its maintenance.

On the other hand, recovery of noble metals from a high level reprocessing waste solution has been regarded as important from the viwpoint of recovery of valuable metals, and a process disclosed in Nuclear technology, 65, page 305 (1984) seems to be promising, but owing to use of such a high temperature as 1,200° C., it still has such problems as volatilization of ruthenium contained in the waste solution and resulting material corrosion, etc. Similar problems are also encountered in a step of heating a waste solution containing Ru, that is, in a concentrating apparatus for the waste solution and an evaporating apparatus for the acid recovery, and it is desirable to remove Ru from the waste solution before the treatment, but no effective process for removing Ru has been available yet.

SUMMARY OF THE INVENTION

An object of the present invention is to solve the aforementioned problems and drastically increase a photo oxidation or reduction efficiency in the photo oxidation or reduction of a dissolved substance in a solution by a semiconductor photocatalyst, which will be hereinafter referred to merely as "photocatalyst", by using an exciting beam for exciting the photocatalyst, the exciting beam having a wavelength equal to or approximating the particle size of the photocatalyst but outside the absorption wavelength region of a dissolved substance capable of producing a reaction-inhibiting substance.

The object can be attained by adding a particulate semiconductor photocatalyst and a water-soluble electron acceptor or donor for the particulate semiconductor photocatalyst to a solution containing a dissolved substance, and irradiating the particulate semiconductor photocatalyst in the solution with an electromagnetic wave having an energy high enough to excite the particulate semiconductor photocatalyst. Furthermore, the object can be more effectively attained by adding a particulate semiconductor photocatalyst and a water-soluble electron acceptor or donor for the particulate semiconductor photocatalyst to a solution containing a dissolved substance, and irradiating the particulate semiconductor photocatalyst in the solution with an electromagnetic wave having an energy high enough to excite the particulate semiconductor photocatalyst and a wavelength outside the absorption wavelength region of a precursor substance capable of producing a substance inhibiting the desired oxidation or reduction reaction. The particulate semiconductor photocatalyst will be hereinafter referred to merely as "semiconductor photocatalyst".

First of all, the basic principle of a process for oxidizing or reducing various dissolved substances, for example, metal ions or metal complexes, in a solution by a semiconductor photocatalyst will be described.

An example of a reduction process will be described at first. When a semiconductor substance such as titanium oxide ($TiO_2$) is irradiated with a beam having a higher energy level than the band gap energy level (visible light or ultraviolet light), the electrons in the valence band is excited into the conduction band, and positive holes are formed in the valence band. In a system where the semiconductor is in contact with a solution, the positive holes and excited electrons formed by the beam irradiation are diffused into the solution, and the positive holes give an oxidation action according to the following equation (1), whereas the excited electrons give a reduction reaction according to the following equation (2). Suppose that the water-soluble electron donor is A, and the ion to be reduced is M, reactions take place according to the following equations (1) and (2):

$$A^- + p^+ \text{ (positive hole)} \rightarrow A \tag{1}$$

$$M^+ + e^- \text{ (excited electron)} \rightarrow M \tag{2}$$

It is possible to induce the reduction reaction of metal ions in the solution by light on the basis of such semiconductor properties. In that case, the reaction efficiency can be increased by using the semiconductor in the form of fine particles. Thus, the oxidation or reduction action can be promoted by suspending the semiconductor as fine particles in the order of submicron size in a solution and by successive light irradiation. Furthermore, the efficiency of reduction action can be improved by adding an organic compound, for example, an alcohol, an aldehyde, glycerine, etc. thereto as an electron donor. When the oxidation or reduction is directed to ions of noble metals, heavy metals or transition metals, and the metals are to be recovered by making the valencies zero, or when the valencies are adjusted by the reduction reaction, the added organic compound irreversibly undergoes oxidative decomposition by the positive holes and the reoxidation of the desired product from the reduction reaction can be suppressed.

On the other hand, the oxidation reaction proceeds as follows. In the reaction, an electron acceptor is used. The electron acceptor undergoes reduction by excited electrons of the semiconductor photocatalyst, and the reduction of the desired product from the oxidation reaction can be suppressed.

In the present invention, the particulate semiconductor photocatalyst with a noble metal or a metal oxide such as platinum or $RuO_2$ or the like on the surface has a higher activity as a photocatalyst for the oxidation or reduction reaction, and thus is more effective, because the supported metal acts as a cathode when the excited electrons take part in the reduction reaction, and thus the overvoltage can be lowered.

The particulate semiconductor photocatalyst for use in the present invention, which will be hereinafter referred to as "photocatalyst", is the one capable of absorbing a specific electromagnetic wave to excite the electrons in the valence band and form positive holes at the same time, that is, the one capable of undergoing photo-polarization, for example, $TiO_2$, $SrTiO_3$, $CdS$, $CdSe$, $Si$, $SiC$, $ZnO$, $GaP$, $WO_2$, etc., and the suitable particle size is 0.2 to 1 $\mu$m, particularly 0.4 to 0.6 $\mu$m.

The electron donor suitable for use in the present invention is the one capable of irreversibly undergoing oxidation by the positive holes formed by the photo excitation of the photocatalyst to supply electrons, and includes organic acids such as formic acid, acetic acid, etc., and amino acids besides those mentioned above.

The electron acceptor suitable for use in the present invention is the one capable of irreversibly undergoing reduction by the electrons formed by the photo excitation of the photocatalyst, that is, capable of receiving the electrons, such as a supply source for $Ag^+$, $Pd^{2+}$, $Co(NH_3)_5{}^{3+}$, etc., for example $AgCl$, $AgNO_3$, $PdCl_2$ cobalt amine complexes, etc.

The dissolved substance herein referred to is an ion or a complex whose oxidation potential or reduction potential is between the energy level of the conduction band and the energy level of the valence band of a photocatalyst to be used, and includes, for example, anions, cations, organic complexes, inorganic complexes, etc.

In the present invention, the photocatalyst can have a higher photocatalytic action by allowing the photocatalyst to support a noble metal on the surface. The noble metal for this purpose includes noble metals and noble metal compounds such as platinum, palladium, ruthenium dioxide, etc.

The electromagnetic wave herein referred to is the one which has an energy level higher than the band gap energy level of a photocatalyst and can excite the photocatalyst, for example, visible light, ultraviolet light, near infrared light, etc.

The present inventors have experimentally found that the wavelength of the electromagnetic wave to be irradiated onto the photocatalyst has an influence upon the oxidation or reduction efficiency of dissolved substance, and the following two factors are involved. The present invention has been established by combining these two factors to improve the efficiency.

Figure 2:
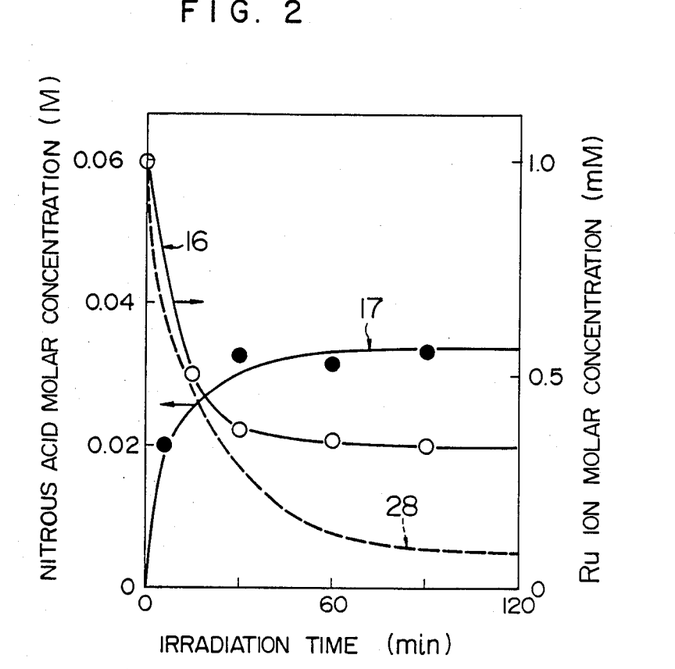
FIG. 2 is a diagram showing changes in Ru ion concentration and nitrous acid concentration according to one embodiment of the present invention.

Description will be made of the first factor. The present inventors conducted tests of photoreduction of metal ions such as Ru ions, Pd ions, etc. in a nitric acid solution by a photocatalyst, and have found that nitrous acid $HNO_2$ or nitrite ions $NO_2{}^-$ formed by the light irradiation inhibits the desired reduction reaction of metal ions. Results of light irradiation of a 3 N nitric acid solution containing 1 mole/l of Ru ions, admixed with a photocatalyst and 20% by volume of ethanol as an electron donor are shown in FIG. 2 as one example. It is seen from FIG. 2 that nitrous acid is accumulated in the solution, as given by curve 17, with the light irradiation, and the reduction reaction of Ru ions proceeds less, as shown by curve 16. As a result of further study, it has been found that the following inhibiting reaction by nitrous acid is the main cause:

$$ti\ M^+ + HNO_2 + H^+ \rightarrow M^{2+} + NO + H_2O \tag{3}$$

wherein $M^+$ and $M^{2+}$ represent metal ions such as $Ru^{2+}$, $Pu^{3+}$, $U^{4+}$, $Np^{4+}$, etc.

Figure 3:
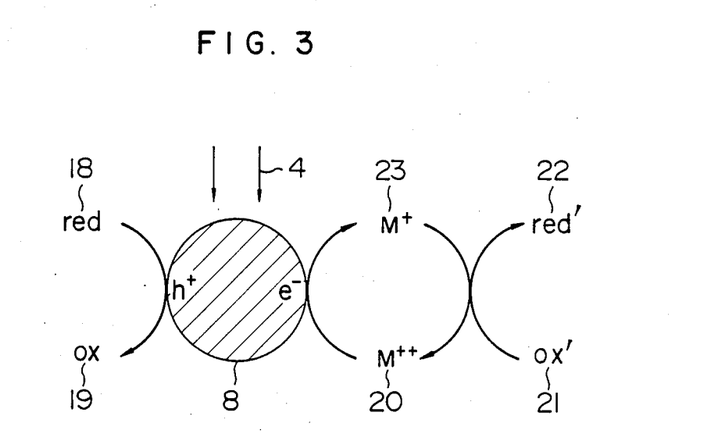
FIG. 3 shows a reaction scheme.

The reaction (3) means such a reverse reaction that the reduction product of a metal ion is reoxidized, which is a cause for lowering the efficiency of the desired reduction. The reaction scheme can be given as in FIG. 3. When a photocatalyst 8 is irradiated with an exciting light 4 in FIG. 3, a metal ion 20 is reduced to another metal ion 23 by the excited electron according to the equation (2), whereas an electron donor 18 is oxidized to an oxidation product 19 according to the equation (1). These are basic reactions. If there is an electron acceptor 21 acting as an oxidizing agent in the system, there occurs such a reverse reaction that the metal ion 23 is oxidized. For example, nitrous acid in the nitric acid solution corresponds to the electron acceptor.

Another inhibition by nitrous acid occurs when Ru ions are to be reduced. Ru ions are changed into nitrosyl complex or nitro complex that are hard to reduce.

$$2Ru^{3+} + 3HNO_2 \rightarrow 2RuNO^{3+} + HNO_3 + H_2O \tag{4}$$

The NO formed according to the equation (3) is formed into nitrous acid again according to the following equation (5):

$$2NO + HNO_3 + H_2O \rightleftharpoons 3HNO_2 \qquad (5)$$

That is, the reverse reaction of equation (1) autocatalytically occurs so long as there is nitrous acid in the system. Thus, it is necessary to provide conditions for forming no nitrous acid in the system to improve the efficiency of the desired reaction. As a result of further extensive studies on the conditions for forming nitrous acid by photoreduction of metal ions with a photocatalyst, the present inventors have found that the photolysis of nitric acid is a cause for forming nitrous acid according to the following equation:

$$NO_3^- + h\nu \rightarrow NO_{22}^- + \cdot O \qquad (6)$$

Figure 4:
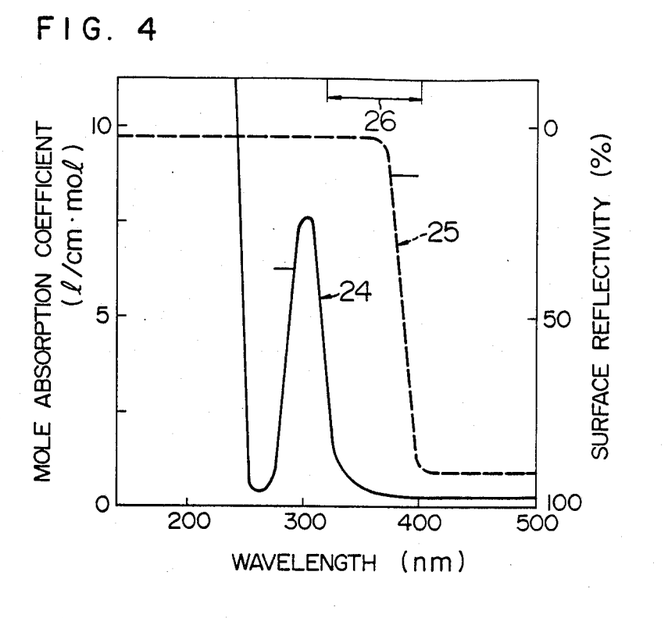
FIG. 4 is a diagram showing a wavelength region of the exciting light according to the present invention.

As is obvious from the absorption spectrum 24 of nitric acid shown in FIG. 4, the reaction occurs below the exciting wavelength of 330 nm, and nitrous acid is formed with a quantum yield of about 0.1.

In the foregoing studies of photoreduction of various species of metal ions in a solution with a photocatalyst it has been found that the photoreduction of ions such as metal ions or other dissolved substances can be carried out very efficiently by using an exciting light whose wavelength particularly covers the exciting wavelength of the photocatalyst to be used and excludes the absorption wavelength region of ions or dissolved substances by-producing oxidizable substances. More specifically in case of photoreductive recovery of noble metal ions in an aqueous nitric acid solution with titanium dioxide as a photocatalyst, the reductive recovery can be efficiently carried out by using an exciting light whose wavelength can satisfy the exciting wavelength of the photocatalyst of not more than 400 nm and can exclude the wavelength region capable of inducing the revese reaction, that is, the wavelength capable of forming nitrous acid of less than 330 nm, that is, whose wavelength is controlled to 330 to 400 nm. Furthermore, the efficient reductive recovery can be promoted by limiting the liquid temperature to a temperature region that cannot activate the reaction to form nitrous acid, that is, not more than 20° C., preferably, not more than 10° C.

Description will be made of the second factor. Oxidation or reduction reaction by the semiconductor photocatalyst is carried out with the electrons excited in the conduction band by the light. The number of electrons excited in the conduction band is proportional to the quantity of light absorbed by the semiconductor photocatalyst. To promote the oxidation or reduction reaction, it is necessary that the excited light is much more absorbed. Generally, the absorption cross-sectional area based on the excitation from the valence band to the conduction band is constant, and a bulky material has a value specific to the material. Thus, the light absorption by a semiconductor photocatalyst is constant, depending upon the species of the photocatalyst. However, the light absorption of a photocatalyst can be increased by making the photocatalyst into a particulate state, and thus the oxidation or reduction reaction can be promoted thereby.

When the particulate substance is irradiated with light, the light is scattered. A portion of the scattered light is absorbed by the particles. The absorption cross-sectional area of scattered light by the particles depends upon the particle size, and in the region where the particle size is equal to the wavelength of the light, the light scattering turns into a resonance scattering. That is, the light scattering cross-sectional area and the absorption cross-sectional area can be increased resonately.

Figure 5:
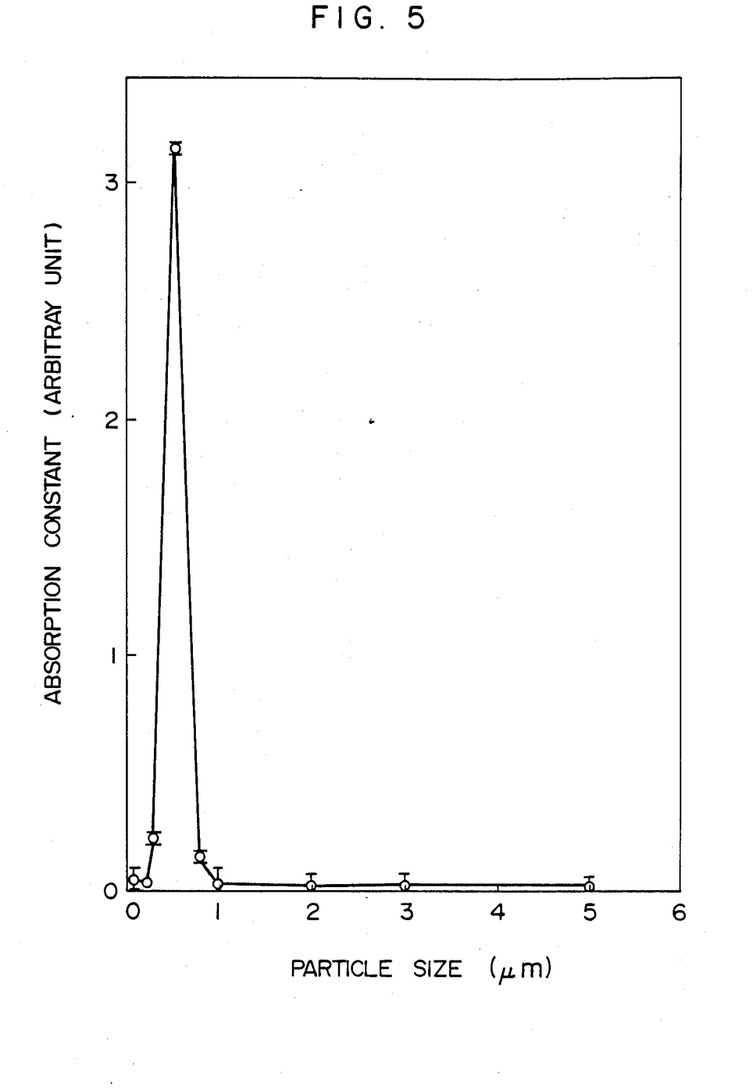
FIG. 5 is a diagram showing the dependency of the absorption constant of suspended sample on the particle size.

In FIG. 5, dependency of the absorption constant of suspended sample upon the particle size, as measured by photoacoustic spectroscopy (PAS), is shown, and it is seen therefrom that the absorption constant becomes a maximum at the particle size of 0.5 $\mu$m which is equal to the exciting light wavelength, 0.5 $\mu$m (488 nm) of PAS. That is, the light absorption of a photocatalyst can be drastically increased by using photocatalyst particles whose particle size is substantially equal to the exciting light wavelength, and consequently the oxidation or reduction reaction can be promoted.

As already described above, the absorption cross-sectional area can be increased resonantly when the light wavelength and the particle size are substantially equal to each other, and consequently the catalytic activity can be considerably increased thereby. The light scattered by particles also irradiates other particles, and the substantial irradiation amount of light onto the particles is increased by repetitions of the scattering and irradiation steps. Consequently the light absorption can be effectively increased. That is, the secondary effect of increasing the light scattering and the consequent light absorption by making the particle size and the light wavelength substantially equal to each other can contribute to the promotion of the oxidation or reduction reaction by the photocatalyst.

The limitation of the wavelength of the exciting light herein referred to can be carried out by using a laser beam having an emission wavelength in the relevant wavelength region, for example, a nitrogen gas laser or an excimer laser such as XeF laser, etc., or the third harmonic wave of YAG laser as a light source, or by passing a light of wide spectral region from, for example, a high pressure mercury lamp or a xenon lamp or a solar beam through a glass filter capable of cutting off the wavelength regions other than the relevant wavelength region.

In the presnnt invention, the valency of substances or ions in a solution can be efficiently adjusted or noble metals, heavy metals or transition metals present in the form of ions can be efficiently recovered by using an electromagnetic wave, for example, a laser beam. For example, in a reprocessing plant for spent nuclear fuel, the semiconductor photocatalyst can reduce the noble metals in the reprocessing solution, whereby ions of Ru, etc. can be reduced to zero valencies and recovered as metals, and thus removed from the reprocessing solution. In other words, cracking of solidified glass, piping corrosion, etc. due to the volatilization and corrosion action of Ru in the successive reprocessing steps can be prevented.

PREFERRED EMBODIMENTS OF THE INVENTION

Embodiments of the present invention will be described in detail below, referring to the accompanying drawings.

Example 1

First of all, an embodiment of the present invention, as applied to photoreductive recovery of noble metal elements, for example, Ru, Pd and Rh, from reprocessing, radioactive spent solutions of high to intermediate level, i.e. aqueous nitric acid solutions containing various fission product ion species, will be described, referring to FIGS. 1 and 2.

Figure 1:
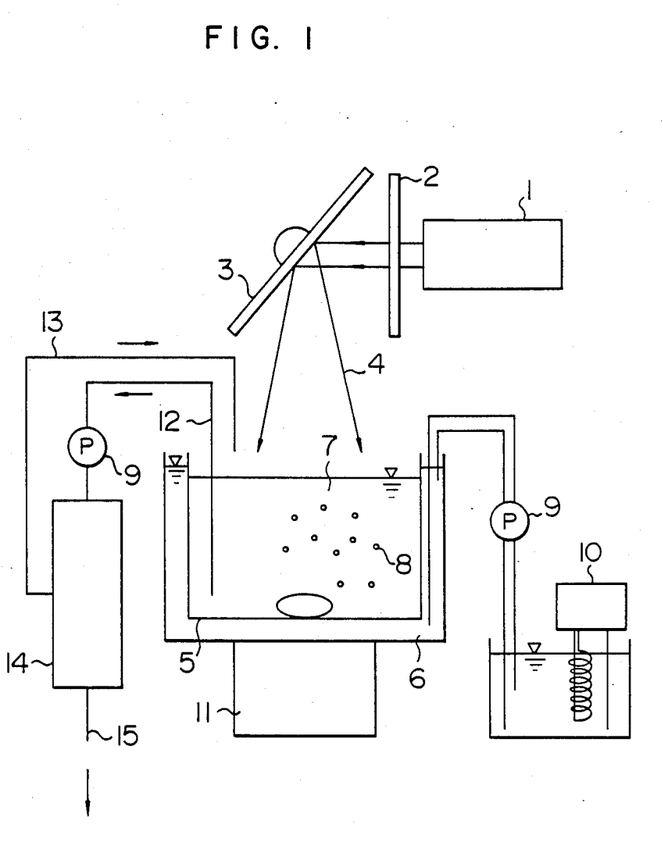
FIG. 1 shows a schematic structure of a photoreduction apparatus according to one embodiment of the present invention.

In FIG. 1, the structure of an apparatus for reducing metal ions or metal complexes according to one embodiment of the present invention is shown. Exciting light 4 emitted from a light source 1 is passed through a glass filter 2, and the light path is deflected by a reflecting mirror 3 to irradiate a solution 7 to be treated in a reaction vessel 5. The solution 7 contains fine particles 8 of a photocatalyst, which are uniformly distributed in the solution 7 by a stirrer 11. The reaction vessel 5 is controlled to an optimum temperature by a water jacket 6 and a temperature-controlling means 10. The treated solution 7 after the reaction is transferred through a spent solution line 12 in the arrow direction by a pump 9, and the used catalyst and recovered metals are separated from the treated solution in a photocatalyst recovery means 14. The recovered photocatalyst is transferred through a recycle line 13 in the arrow direction, whereas the spent solution is transferred to the successive step through a piping 15.

Results of the embodiment will be described below. An aqueous 3N nitric acid solution containing 0.1 g/l Ru was used as a solution to be treated (a simulated spent solution), and $TiO_2$ powder having platinum on the surface and ethanol as a water-soluble electron donor for preventing the reverse reaction were added thereto. A light from a Xe lamp was allowed to irradiate the solution. The progress of Ru ion reduction reaction was observed through changes in the absorption spectrum (453 nm) by an absorptiometer. The output of the Xe lamp used was 2 kW, but the actually available light intensity in the spent solution was about 200 mW. The $TiO_2$ used had a particle size distribution of $0.5\pm0.2$ $\mu m$ which was substantially included in the wavelength region of the light from the Xe lamp.

Changes in the Ru ion concentration by photoreduction with time is shown in FIG. 2, where the full line 16 shows a case of direct irradiation of the light from the Xe lamp, and the dotted line 28 shows a case of irradiation of the light from the Xe lamp after the elimination of light with wavelengths of less than 330 nm through an ultraviolet cut filter to prevent formation of nitrous acid as a reaction-inhibiting substance. After the test, the treated solution was filtered through a millipore filter with pore size of 0.22 $\mu m$ and subjected to fluorescent X-ray analysis for solid matters. Metallic Ru was detected in the $TiO_2$ particles, and it was found that the reduced Ru ions were deposited by reduction. Reductive deposition of Ru ions was possible even by the light directly from the Xe lamp, but the reduction efficiency was about 20% increased by cutting off light with the wavelengths of less than 330 nm.

The reduction efficiency could be drastically increased by using a nitrogen laser (330 nm), a XeF (xenonfluorine) laser (351 nm) or a third harmonic wave (355 nm) of YAG (ythrium-aluminum-garnet) laser as a light source which met the exciting wavelength (not more than 420 nm) and had a wavelength not corresponding, to the wavelength region capable of causing formation of nitrous acid and by using $TiO_2$ with particle sizes equal or near to the wavelengths of these lasers as a photocatalyst. For example, with the XeF laser, the reduction efficiency was $10^0-10^1$ times increased. Among the photocatalyts, $TiO_2$ with no platinum had a low catalytic activity, whereas a sufficient activity was obtained with $TiO_2$ having at least 0.1% by weight of platinum. Furthermore, the Ru ion reduction rate depended upon the amount of an organic compound added. In this embodiment it was preferable to add at least 15% by volume of ethanol thereto to efficiently carry out the reaction. Similar effects were obtained with methanol, formaldehyde or hydrazine as the organic compound to be added.

An embodiment of reductive recovery of Ru in a reprocessing plant for the spent nuclear fuel will be described in detail below, referring to FIGS. 6 and 7.

Figure 6:
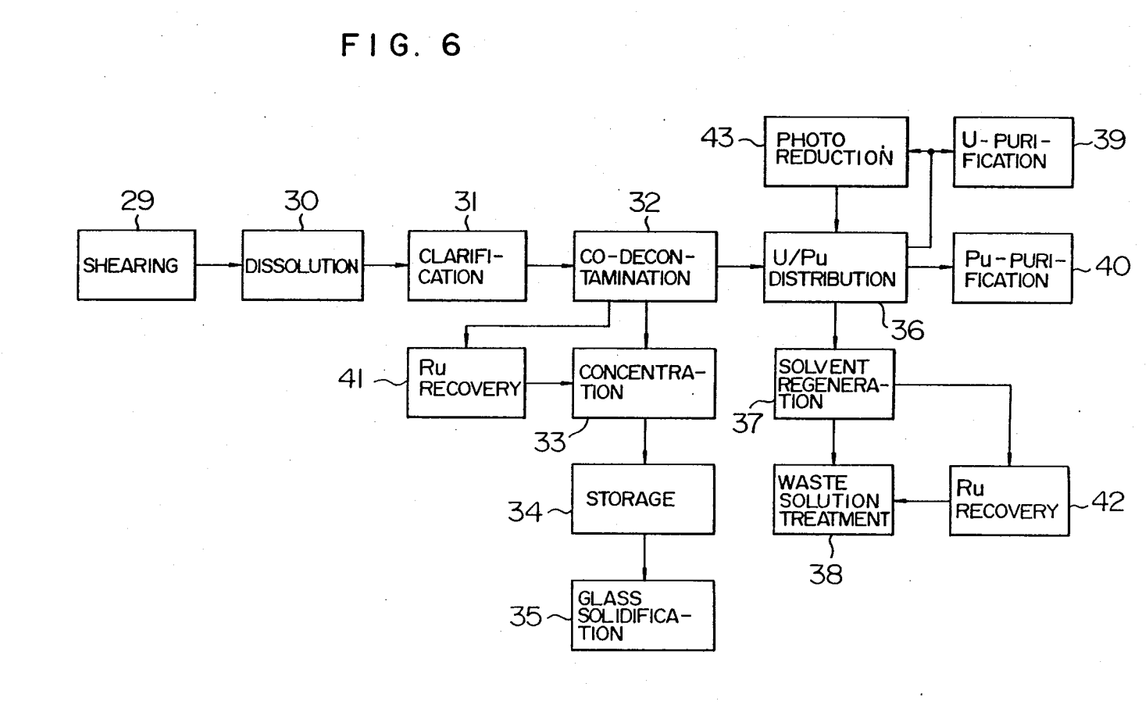
FIG. 6 is an ordinary block diagram showing a spent nuclear fuel reprocessing, nd a block diagram incorporated with the photochemical process according to the present invention.

In FIG. 6, a block diagram of a process for reprocessing a spent nuclear fuel is shown, where useful uranium and plutonium are separated and recovered from a spent nuclear fuel by reprocessing and used for the preparation of a fresh nuclear fuel. The reprocessing process now in practice is based mainly on a wet process called "Purex process". According to the Purex process, the spent nuclear fuel is at first sheared to a length of a few cm together with the cladding in a shearing step 29 and the sheared pieces of nuclear fuel are dissolved in a nitric acid solution in a dissolution step 30, where the cladding, volatile nuclear fission products (rare gases and iodine) and a portion of ruthenium of complicated behavior are removed from the nitric acid solution. In the solution there still remain undissolved nuclear fission products in fine particulate state, which must be removed before the successive reprocessing steps. For the removal, a pulse filter or a centrifugal clarifier is used in a clarification step 31 to remove the insoluble residues. In a successive co-decontamination step 32, uranium and plutonium, and 99% or more of the nuclear fission products are separated from one another by solvent extraction using a tributyl phosphate (TBP) solvent. Uranium and plutonium are transferred into the organic solvent (tributyl phosphate solution) and isolated from each other in a successive distribution step 36, purified in purification steps 39 and 40, and stored.

Most of the nuclear fission products removed in the co-decontamination step 32 are passed through a concentration step 33, and a storage step 34 to a glass solidification step 35 after the volume reduction and cooling. In the glass solidification step 35, the fission products are stably solidified for preservation for a long period of time. The nitric acid solution containing a large amount of the nuclear fission products after te co-decontamination is called a high level waste solution (HLW), and in the concentration step of the high level waste solution and the glass solidification step the behavior of Ru is a particularly important problem. Ru can takes various oxidation states from zero-valent to octavalent. The most stable oxidation state in the solution is a divalent or trivalent state, but Ru can take a zero-valent (Ru metal), tetravalent, hexavalent, octavalent or other oxidation state, depending upon solution conditions (temperature, nitric acid concentration, impurities, etc.). In the concentration step 33 and the glass solidification step 35, a high temperature and a relatively high nitric acid concentration dominate, and thus Ru is liable to take a hexavalent or octavalent state. Particularly, octavalent Ru, that is, $RuO_4$, is a volatile, strong oxidizing agent and can corrode materials of construction of a concentrator, etc. in both gaseous and liquid phases as the main cause for shortening the life of the apparatus. However, no steps have been taken yet for Ru in the concentration and glass solidification apparatuses.

The present invention provides a Ru recovery step 41 before the concentration step 33 for the high level waste solution to prevent Ru from invasion into the concentration step 33 and the glass solidification step 35. In the present invention as applied to the Ru recovery from the reprocessing high level waste solution, a catalyst consumption is only 20 g per hour with an ultraviolet laser of 10 W light power output at the reduction rate as obtained in the present embodiment on an assumption that Ru generation is 5 kg/day (=200 g/hour). When the photocatalyst is recovered for the recycle, theoretically 20 g is permanently enough for the reaction, but actually the photocatalyst is deteriorated or lost due to the continued use and thus a little excess amount of the photocatalyst is required. As an organic compound acting as a water-soluble electron donor, a large amount of formaldehyde is used for the denitration, and thus no addition of fresh water-soluble electron donor is required. These are important advantages in carrying out the present invention.

In the present embodiment Ru can be removed before the concentration step and the glass solidification step, and thus Ru evaporation, clogging of piping and corrosion of materials of construction can be prevented in both steps. That is, the solidified glass with a thoroughly high strength can be obtained in the glass solidification step 35.

Figure 7:
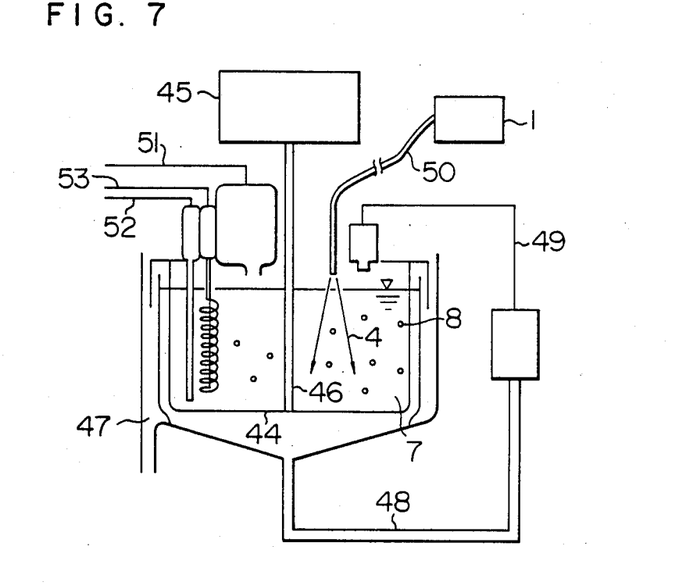
FIG. 7 shows a schematic structure of a photochemical apparatus according to one embodiment of the present invention.

In the Ru recovery step 41, a photoreduction apparatus specifically shown in FIG. 7 is used. The photoreduction apparatus comprises a rotatable vessel 44, a motor 45, a shaft 46, a clarified solution withdrawal line 47, a drainage line 48, and a filter washing line 52. The apparatus is further provided with a light source 1, an optical fiber 50, a process solution inlet line 51 and a photocatalyst recovery-recharge line 49. A HCHO change and a $CO_2$ gas vent line are omitted from the drawing.

At first, a process solution containing noble metal ions such as Ru ions, etc. is charged into the rotatable vessel 44. Then, a photocatalyst is put into the rotatable vessel 44 and light is allowed to irradiate the solution through the optical fiber 50. The rotatable vessel 44 is gently rotated until the photochemical reaction has been completed, thereby stirring the solution. After the end of the reaction, the rotatable vessel is rotated at a higher speed, and the treated solution is withdrawn through the clarified solution withdrawal line 47 and led to the successive step. The photocatalyst deposited on the filter surface is washed with washing water from the filter washing line 52 and withdrawn through the drainage line 48. The photocatalyst is recharged to the rotating vessel 44 through the photocatalyst recovery-recharge line 49 and reutilized. The foregoing operations are repeated to conduct semi-continuous run. The light source 1 is preferably a laser light source, and a XeF laser with an emission wavelength of 350 nm and a high light power output or a third harmonic wave of YAG laser with an emission wavelength of 355 nm is most preferable. In this case, the maximum catalytic activity can be obtained with a photocatalyst having particle sizes of about 0.35 $\mu$m. The solution temperature is controlled to 20° C. or less, preferably, to 10° C. or less, by a temperature control line 53.

The present embodiment is applicable to Ru recovery from an intermediate level waste solution after the distribution step 36 and the solvent regeneration step 37, and problems of corrosion, etc. by Ru in the waste solution treatment step 38 can be solved by providing a Ru recovery step 442.

Recovery of other noble metals such as Rh, Pd, etc. from the high level waste solution can be carried out in the same manner as in case of Ru recovery.

In the present embodiment, a filter having a pore size of preferably 0.22 $\mu$m or less, or a centrifuge is used to recover noble metals such as Ru, Pd, Rh, etc., as deposited by reduction or the used photocatalyst. The noble metals and the photocatalyst recovered through the foregoing operations are dissolved in an acid such as hydrochloric acid, etc., whereby the noble metals deposited on the photocatalyst are removed from the photocatalyst through the dissolution in the acid. Th photocatalyst is then recovered by repeating the aforementioned separating operations and reutilized. These noble metals are very useful in the industrial field of semiconductor parts, catalysts, etc. These noble metals including Ru as recovered are subjected to separation of isomers or can be reutilized after the decay of radioactivity. These noble metals have a good electroconductivity like Pt, and can act as an electrode on the photocatalyst. Thus, the photocatalyst can be reused without 100% removal of these noble metals therefrom by the dissolution in the acid.

EXAMPLE 2

This embodiment of the present invention is an application of the present invention to separation and recovery of Pu in the main process for reprocessing a spent nuclear fuel. That is, the conventional reduction of $Pu^{4+}$ to $Pu^{3+}$ by $U^{4+}$ in the reprocessing process based on the Purex process can be replaced with direct reduction of $Pu^{4+}$ to $Pu^{3+}$ by a photocatalyst according to the present invention.

In the reprocessing process shown in FIG. 6, valencies are adjusted in the co-decontamination step 32, for example, from $U^{4+}$ to $UO_2^{2+}$ and fron $Pu^{3+}$ to $Pu^{4+}$ to transfer the nuclear fission products into the aqueous phase and U and Pu as the nuclear fuel components into an organic phase and separate the nuclear fission products from the nuclear fuel components. After the co-decontamination step 32, U is separated from Pu in the distribution step 36, where, in order to transfer U into an organic phase and Pu into an aqueous phase, it is necessary to adjust the valency of Pu, i.e. reduce $Pu^{4+}$, which is more liable to be transferred into the organic phase, to $Pu^{3+}$, which is more liable to be transferred into the aqueous phase. In the present embodiment, $Pu^{4+}$ is directly reduced to $Pu^{3+}$ by using a photocatalyst in the distribution step 36, whereby the U/Pu distribution can be simply and efficiently carried out.

Even in this step, the reduction product $Pu^{3+}$ is oxidized by nitrous acid according to the following reaction.

$$Pu^{3+} + HNO_2 + 2H^+ \rightarrow Pu^{4+} + NO + H_2O \tag{7}$$

Thus, the reverse reaction of equation (7) can be suppressed by controlling the exciting wavelength to 330–400 nm according to the present invention, and thus the valency adjustment by photoreduction can be carried out efficiently.

In the present embodiment, it is preferable to use a reaction apparatus shown in FIG. 7, but the reaction apparatus shown in FIG. 1 can also be used. A most suitable photocatalyst is $TiO_2$ or SiC, which has a noble metal such as platinum, etc. on the surface. A preferable light source is a laser light source, and a XeF laser with an emission wavelength of 350 nm and a high light power output or a third harmonic wave of YAG laser with an emission wavelength of 355 nm is most preferable. In this case, the maximum catalytic activity can be obtained with a photocatalyst having particle sizes of about 0.35 μm. The solution temperature is controlled to 20° C. or less, preferably, to 10° C. or less, by a temperature control line 53, whereby the reaction efficiency can be improved. As an electron donor, formaldehyde (HCHO), methanol, hydrazine, etc. can be used.

As described above, $Pu^{4+}$ can be directly reduced to $Pu^{3+}$ by photochemical reaction using a photocatalyst, and problems of apparatus corrosion and complication of the process as encountered in the conventional process can be solved, and the present invention is also applicable to the reprocessing of a nuclear fuel containing much Pu, such as a nuclear fuel from fast breeder reactors.

EXAMPLE 3

This embodiment of the present invention is to use uranous ions, i.e. $U^{4+}$ as a reducing agent in the reduction of Pu in place of the direct reduction of Example 2. That is, the present invention is used in a process for producing uranous ions in the present embodiment. Specifically, in the reprocessing process shown in FIG. 6, a portion of uranyl ions $UO_2^{2+}$ purified in the distribution step 36 is recycled and reduced to uranous ions by photoreduction in a photoreduction step 43 and used as a reducing agent for $Pu^{4+}$. The present invention can be carried out by providing a simple apparatus shown, for example, in FIG. 1 or FIG. 7 without changing the main steps of the reprocessing process.

In the present invention, light irradiation is carried out in the presence of a photocatalyst and an electron donor with an exciting wavelength controlled to 330–340 nm to suppress the following oxidation reaction of uranous ions by nitrous acid which lowers the reduction efficiency.

$$U^{4+} + HNO_2 \rightarrow UO_2^{2+} + 2NO + 2H^+ \tag{8}$$

When the solution temperature is controlled to 20° C. or less by a temperature control means shown in FIG. 1 or FIG. 7 in this case, the formation of nitrous acid can be more effectively prevented. A most suitable photocatalyst is $TiO_2$ or SiC, which has a noble metal such as platinum, etc. on the surface. A preferable light source is a laser light source, and a XeF laser with an emission wavelength of 350 nm and a high light power output or a third harmonic wave of YAG laser with an emission wavelength of 355 nm is most preferable. In this case, the maximum catalytic activity can be obtained with a photocatalyst having particle sizes of about 0.35 μm. As an electron donor, ethanol, formaldehyde and hydrazine are preferable, and unreacted electron donors, even if entered into the main steps, have no process problems.

In this embodiment, a portion of uranyl ions ($UO_2^{2+}$) is recycled to produce uranous ions ($U^{4+}$) as a reducing agent for $Pu^{4+}$ by providing a simple reaction apparatus shown, for example, in FIG. 1 or FIG. 7, without changing the main steps of the reprocessing process.

EXAMPLE 4

Figure 8:
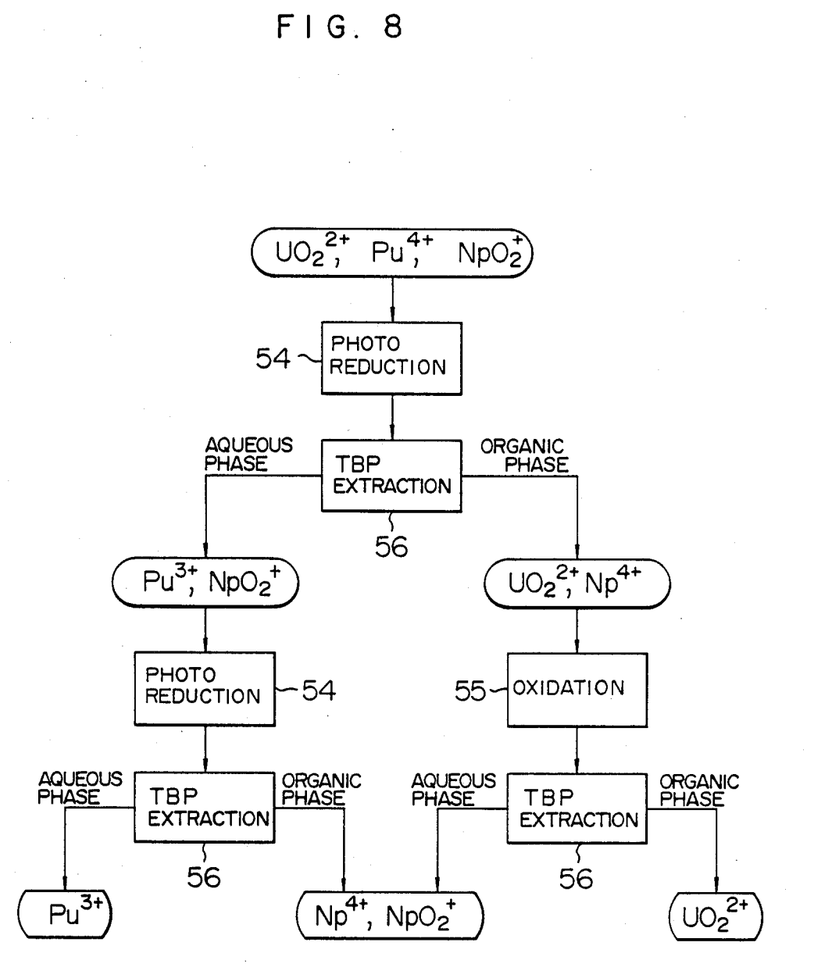
FIG. 8 is a flow diagram of a process for separating U, Pu and Np from one another according to one embodiment of the present invention.

This embodiment shows an efficient separation of U, Pu and Np in the reprocessing-distribution step. Np has not been so far regarded as important, because the nuclear fission yield of Np is about 1/10 of that of Pu, but Np is an element of long half-life having a high radioactive level and a high chemical toxicity, and thus contamination of U and Pu product with Np must be avoided. Thus, some measures must be taken against the Np mixed into the organic phase in the co-contamination step by separating Np from U and Pu in the distribution step to obtain a high level waste solution, or by isolating only Np to subject Np to an extinction treatment. Np takes valencies of from tetravalent to hexavalent in a nitric acid solution, but only pentavalent Np cannot be extracted into the organic phase, that is, TBP. The present embodiment utilizes this property of Np, as shown in FIG. 8.

A solution containing U, Pu and Np is at first subjected to reduction in a photoreduction step 54 for a predetermined time, and then to TBP extraction, whereby the reduced $Pu^{3+}$ and $NpO_2^+$ are transferred into the aqueous phase and the reduced $Np^{4+}$, $U^{4+}$ and unreduced $UO_2^{2+}$ are transferred into the organic phase. These operations constitute a first cycle. The photoreduction step 54 is carried out in an apparatus shown in FIG. 1 or FIG. 7 in the presence of $TiO_2$ or SiC that has a noble metal such as platinum, etc. on the surface as a photocatalyst and ethanol, formaldehyde or the like as an electron donor. Formation of nitrous acid is suppressed by using an exciting light with a wavelength controlled to 330–400 nm at a solution temperature controlled to 20° C. or less, preferably to 10° C. or less in the same manner as in the foregoing Examples.

A second cycle comprises reduction of $NpO_2^+$ to $Np^{4+}$ among the $Pu^{3+}$ and $NpO_2^+$ transferred into the aqueous phase in a photoreduction step 54 and a successive TBP extraction, whereby $Pu^{3+}$ is transferred into the aqueous phase and $Np^{4+}$ is transferred into the organic phase to complete the separation of Pu from Np. Among the $UO_2^{2+}$ and $Np^{4+}$ transferred into the organic phase in the first cycle, it is necessary to oxidize $Np^{4+}$ to $NpO_2^+$. The oxidation reaction can be carried out by adding an oxidizing agent such as a nitrite to the system from the outside or with nitrous acid formed within the system. In an oxidation step 55, a nitrite is added to the system or a NOx gas is injected into the system in case of the former, and nitrous acid is formed by irradiating light with a wavelength of less than 330 nm at a solution temperature higher than 30° C. to activate the reaction to form nitrous acid through photolysis of nitric acid. In this case, it is not necessary to add a photocatalyst to the system. Then, $NpO_2^+$ is transferred into the aqueous phase and $UO_2^{2+}$ is transferred into the organic phase by TBP extraction to complete the separation of U from Np.

A most suitable photocatalyst for use in the present embodiment is $TiO_2$ or SiC which has a noble metal such as platinum, etc. on the surface. A preferable light source is a laser light source, and a XeF laser with an emission wavelength of 350 nm and a high light power output or a third harmonic wave of YAG laser with an emission wavelength of 355 nm is most preferable. In this case, a maximum catalytic activity can be obtained with a photocatalyst with particle sizes of about 0.35 μm. When $WO_3$ is used as a photocatalyst, a most preferable particle size is 0.45 μm and a most preferable light source is a dye laser pumped with a YAG laser or a copper vapor laser. A suitable electron donor is ethanol, formaldehyde or hydrazine.

EXAMPLE 5

This embodiment shows an application of the present invention to separation of cerium ions, where $Ce^{3+}$ is oxidized to $Ce^{4+}$ under the oxidation action of a photocatalyst, and recovered as iodate precipitates. The reaction proceeds as follows:

$$Ce^{3+} + Ce^{4+} + 4IO_3^- \rightarrow Ce^{3+} + Ce(IO_3)_4 \downarrow \qquad (9)$$

An aqueous iodate solution in a 5-fold amount of that of cerium ions as contained is added to a solution containing the cerium ions, and then $TiO_2$ or $WO_3$ is added thereto at a concentration of about 2 g/l, and silver ions or palladium ions are further added thereto as an electron acceptor. Then, the solution is irradiated with light. When $TiO_2$ is used as the photocatalyst, a most preferable light source is a XeF laser with an emission wavelength of 350 nm and a high light power output or a third harmonic wave of YAG laser with an emission wavelength of 355 nm. In this case, a maximum catalytic activity can be obtained with a photocatalyst with particle sizes of about 0.35 μm. When $WO_3$ is used as the photocatalyst, a most preferable particle size is 0.45 μm, and a most preferable light source is a dye laser pumped with a YAG laser or a copper vapor laser. The present embodiment is effective for selectively removing cerium ions from a plurality of coexisting ions as in a high level waste solution.

According to the present invention, the following effects can be obtained.

(1) Ions or complexes can be converted to simple substances, or to ions or compounds having other valencies.

(2) Simple substances, ions, complexes or other compounds can be separated and recovered, or removed by utilizing the effects and function of the present invention as described above.

What is claimed is:

1. A proces for oxidizing or reducing a dissolved substance which comprises adding a particulate semiconductor photocatalyst and a water-soluble electron acceptor or donor for the pariculate semiconductor photocatalyst to a solution containig a dissolved substance and irradiating the particulate semiconductor photocatalyst in the solution with an electromaonetic wave having an energy high enough to excite the pariculate semiconductor photocatalyst and a wavelength subsantially equal to the particle size of the particulate semiconductor photocatalyst.

2. A process according to claim 1, wherein the particulate semicnductor photocatalyst supports a platinum group element on the surface.

3. A proces according to claim 1, wherein the dissolved substance is selected from noble metals, heavy metals, transitio metals, and actinide elements.

4. A process according to claim 1, wherein irradiating the particulate semiconductor photocatalyst produces positive holes and excited electrons which are diffused into said solution causing said oxidizing or reducing of said dissolved substantce.

5. A process according to claim 4, wherein said water-soluble electron acceptor is added to said solution and said positive holes cause said oxidation of said dissolved substance.

6. A process according to claim 4, wherein said water-soluble electron donor is added to said solution and said excited electrons cause said reducing of said dissolved substance.

7. A process according to claim 6, wherein said dissolved substance comprises noble metal ions or noble metal complexes.

8. A process according to claim 4, wherein said particulate semiconductor photocatalyst is selected from the group consisiting of $TiO_2$, $SrTiO_3$, CdS, CdSe, Si, SiC, ZnO, GaP and $WO_2$.

9. A process according to claim 4, wherein said particulate semiconductor photocatlyst has a particle size of 0.2 to 1 μm.

10. A process according to claim 4, wherein said particulate semiconductor photocatalyst has a particle size of 0.4 to 0.6 μm.

11. A process for oxidizing or reducing a dissolved substance, which comprises adding a particulate semiconductor photocatalyst and a water-soluble electron acceptor or donor for the particulate semiconductor photocatalyst to a solution containing a dissolved substance and irradiating the particulate semiconductor photocatalyst in the solution with an electromagnetic wave having an energy high enough to excite the particulate semiconductor photocatalyst and having a wavelength outside the absorption wavelength region of a precursor substance capable of producing an oxidation or reduction reaction-inhibiting substance and substantially equal to the particle size of the particulate semiconductor photocatalyst.

12. A process according to claim 11, wherein the particulate semiconductor photocatalyst supports a platinum group element on the surface.

13. A process according to claim 12, wherein the dissolved substance is selected from noble metals, heavy metals, transition metals, and actinide elements.

14. A process according to claim 11, wherein irradiating the particulate semiconductor photocatalyst produces positive holes and excited electrons which are diffused into said solution causing said oxidizing or reducing of said dissolved substance.

15. A process according to claim 14, wherein said water-soluble electron acceptor is added to said solution and said positive holes caus said oxidation of said dissolved substance.

16. A process according to claim 14, wherein said water-soluble electron donor is added to said solution and said excited electrons cause said reducing of said dissolved substance.

17. A process according to claim 16, wherein said dissolved substance comprises noble metal ions or noble metal complexes.

18. A process according to claim 14, wherein said particulate semiconductor photocatalyst is selected from the group consisting of $TiO_2$, $SrTiO_3$, CdS, CdSe, Si, SiC, ZnO, GaP and $WO_2$.

19. A process according to claim 14, wherein said particulate semicondutor photocatalyst has a particle size of 0.2 to 1 $\mu$m.

20. A process according to claim 14, wherein said particulate semiconductor photocatalyst has a particle size of 0.4 to 0.6 $\mu$m.

21. A process for oxidizing or reducing a dissolved substance, which comprises adding a particulate semiconductor photocatalyst and a water-soluble electron acceptor or donor for the particulate semiconductor photocatalyst to a solution containing a dissolved substance, and irradiating the particulate semiconductor photocatalyst in the solution with a laser beam having an energy high enough to excite the particulate semiconductor photocatalyst and having a wavelength outside the absorption wavelength region of a precursor substance capable of producing an oxidation or reduction reaction-inhibiting substance and substantially equal to the particle size of the particulate semiconductor photocatalyst.

22. A process according to claim 21, wherein the particulate semiconductor photocatalyst support a platinum group element on the surface.

23. A process according to claim 21, wherein the solution is a waste solution resulting from dissolution of spent nuclear fuel in nitric acid in a nuclear fuel reprocessing step and containing Ru element and being substantially separated and freed from nuclear fuel components.

24. A process according to claim 23, wherein the waste solution is waste solution resulting from the dissolution of spent nuclear fuel in nitric acid before said waste solution is solidified by glass solidification.

25. A process according to claim 21, wherein irradiating the particulate semiconductor photocatalyst produces positive holes and excited electrons which are diffused into said solution causing said oxidizing or reducing of said dissolved substance.

26. A process according to claim 25, wherein said water-soluble electron acceptor is added to said solution and said positive holes cause said oxidation of said dissolved substance.

27. A process according to claim 25, wherein said water-soluble electron donor is added to said solution and said excited electrons cause said reducing of said dissolved substance.

28. A process according to claim 27, wherein said dissolved substance comprises noble metal ions or noble metal complexes.

29. A process according to claim 25, wherein said particulate semiconductor photocatalyst is selected from the group consisting of $TiO_2$, $SrTiO_3$, CdS, CdSe, Si, SiC, ZnO, GaP and $WO_2$.

30. A process according to claim 25, wherein said particulate semiconductor photocatalyst has a particle size of 0.2 to 1 $\mu$m.

31. A process according to claim 25, wherein said particulate semiconductor photocatalyst has a particle size of 0.4 to 0.6 $\mu$m.

* * * * *